US010684809B2

(12) United States Patent
Watanabe

(10) Patent No.: US 10,684,809 B2
(45) Date of Patent: Jun. 16, 2020

(54) IMAGE FORMING APPARATUS SELECTIVELY OPERABLE AS A GATEWAY, METHOD FOR SUPPORTING ACCESS, AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventor: Yoshiki Watanabe, Itami (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/861,417

(22) Filed: Jan. 3, 2018

(65) Prior Publication Data
US 2018/0203656 A1 Jul. 19, 2018

(30) Foreign Application Priority Data

Jan. 19, 2017 (JP) ................................ 2017-007275

(51) Int. Cl.
*G06F 3/12* (2006.01)
(52) U.S. Cl.
CPC .......... *G06F 3/1286* (2013.01); *G06F 3/1203* (2013.01); *G06F 3/1236* (2013.01); *G06F 3/1287* (2013.01); *G06F 3/1288* (2013.01); *G06F 3/1291* (2013.01); *G06F 3/121* (2013.01); *G06F 3/1222* (2013.01); *G06F 3/1292* (2013.01); *H04N 2201/0094* (2013.01)
(58) Field of Classification Search
CPC ..... H04L 12/66; G06F 3/1222; G06F 3/1286; G06F 3/1287; G06F 3/1288; G06F 3/1291; G06F 3/1292; H04N 2201/0094

USPC ....... 358/1.11–1.18; 709/201–203, 212–219, 709/227–229, 238, 239

See application file for complete search history.

(56) References Cited

U.S. PATENT DOCUMENTS

| 2007/0011262 A1* | 1/2007 | Kitani | ..................... H04L 63/02 709/213 |
| 2011/0258433 A1* | 10/2011 | Pulini | ..................... H04L 63/20 713/153 |
| 2012/0195603 A1* | 8/2012 | Nakata | ............... G03G 15/5075 399/8 |

(Continued)

FOREIGN PATENT DOCUMENTS

| JP | 2015011599 A | 1/2015 |
| JP | 2015162034 A | 9/2015 |
| JP | 2015173370 A | 10/2015 |

*Primary Examiner* — Chad Dickerson
(74) *Attorney, Agent, or Firm* — Holtz, Holtz & Volek PC

(57) ABSTRACT

An image forming apparatus for use in a network to establish a first session with a server external to the network in order to allow access from the server and connected to a relay device provided in the network is provided. The image forming apparatus includes a selector configured to change a communication mode of the image forming apparatus to any one of a first mode to function as a gateway and a second mode not to function as the gateway according to communication conditions with the relay device; and a communication device configured to establish, when the communication mode is changed from the second mode to the first mode, a second session with the server; wherein the selector establishes the second session when it is impossible to perform communication with the relay device.

16 Claims, 13 Drawing Sheets

(56) References Cited

U.S. PATENT DOCUMENTS

| | | |
|---|---|---|
| 2015/0002895 A1 | 1/2015 | Nakatsuka et al. |
| 2015/0242177 A1* | 8/2015 | Nakahara .............. G06F 3/1287 358/1.15 |
| 2015/0261273 A1 | 9/2015 | Uchida et al. |
| 2016/0014088 A1* | 1/2016 | Maekawa ............. H04L 67/141 726/12 |
| 2016/0150112 A1* | 5/2016 | Anezaki ............. H04N 1/00891 358/1.13 |

* cited by examiner

| IMAGE FORMING APPARATUS | | RELAY DEVICE | | |
|---|---|---|---|---|
| IP ADDRESS | DEVICE NAME | IP ADDRESS | SERIAL NUMBER | |
| 192.168.0.101 | MFP_1 | 203.0.113.1 | SN01234 | ~6M |
| 192.168.0.102 | MFP_2 | 203.0.113.1 | SN01234 | ~6M |
| 192.168.0.103 | MFP_3 | 203.0.113.1 | SN01234 | ~6M |
| 192.168.3.1 | PTR_001 | 203.0.113.5 | SN10001 | ~6M |
| 192.168.3.2 | PTR_002 | 203.0.113.5 | SN10001 | ~6M |
| ⋮ | ⋮ | ⋮ | ⋮ | |

IMAGE FORMING APPARATUS SELECTIVELY OPERABLE AS A GATEWAY, METHOD FOR SUPPORTING ACCESS, AND NON-TRANSITORY RECORDING MEDIUM STORING COMPUTER READABLE PROGRAM

The entire disclosure of Japanese Patent application No. 2017-007275, filed on Jan. 19, 2017, is incorporated herein by reference in its entirety.

BACKGROUND

1. Technological Field

The present invention relates to a technology for accessing an image forming apparatus of a LAN from a server on the Internet.

2. Description of the Related Art

Servers on the Internet have conventionally provided various services to image forming apparatuses such as Multifunction Peripherals (MFPs) of a Local Area Network (LAN).

Such a LAN has a firewall for security protection. The firewall does not allow a server to access an image forming apparatus in some cases. In view of this, a relay device such as a gateway is provided in the LAN to establish a session between the server and the relay device. This enables the server to access the image forming apparatus.

The relay device is necessary in order to maintain communication between the server and the image forming apparatus. Thus, when a problem occurs in the relay device, solving the problem is important. With this being the situation, the following technologies have been proposed.

According to an image forming system proposed in one of the technologies, a relay server is provided which connects to an application server on the Internet based on a connection request received from a connection mediation server on the Internet and relays communication between an image formation device in a local network and the application server. The relay server is configured to: determine whether or not an operation state of the subject apparatus is busy at the receipt of the connection request from the connection mediation server; select, if the operation state thereof is busy, other relay server capable of performing the communication with the image formation device as a substitute device; transmit a substitution request to the substitute device; and cause the substitute device to substitute processing for relaying the communication between the image formation device and the application server (Japanese Laid-open Patent Publication No. 2015-162034).

According to the other technology, a gateway device controls a communication between an external device and an image processing apparatus which are connected to each other through a network. A main CPU generates a transfer instruction message depending on the situation of a primary power supply, thereafter, acquires information on the change of state of the gateway device or a device in the vicinity thereof, and then repeatedly updates the transfer instruction message in accordance with the information thus acquired. Further, a sub-CPU operable at a voltage lower than that of the main CPU transmits the transfer instruction message created or updated last to an external alternative device which has a function to execute communication control, depending on the situation of a secondary power supply (Japanese Laid-open Patent Publication No. 2015-173370).

In some cases, a problem occurs in a relay device, which does not allow the full operation of the relay device. The foregoing technologies are intended to cope with a problem arising while a gateway device as the relay device is working. However, the technologies fail to cope with a problem arising when the gateway device does not function at all.

SUMMARY

The present invention has been achieved in light of such a problem, and therefore, an object of an embodiment of the present invention is to enable a server on the Internet to access an image forming apparatus of a network such as a LAN even when a relay device does not function.

To achieve at least one of the abovementioned objects, according to an aspect of the present invention, an image forming apparatus reflecting one aspect of the present invention is an image forming apparatus for use in a network to establish a first session with a server external to the network in order to allow access from the server and connected to a relay device provided in the network, the image forming apparatus including a selector configured to change a communication mode of the image forming apparatus to any one of a first mode to function as a gateway and a second mode not to function as the gateway according to communication conditions with the relay device; and a communication device configured to establish, when the communication mode is changed from the second mode to the first mode, a second session with the server; wherein the selector establishes the second session when it is impossible to perform communication with the relay device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram showing an example of proxy device data.

DETAILED DESCRIPTION OF THE EMBODIMENTS

Hereinafter, one or more embodiments of the present invention will be described with reference to the drawings. However, the scope of the invention is not limited to the disclosed embodiments.

Figure 1:
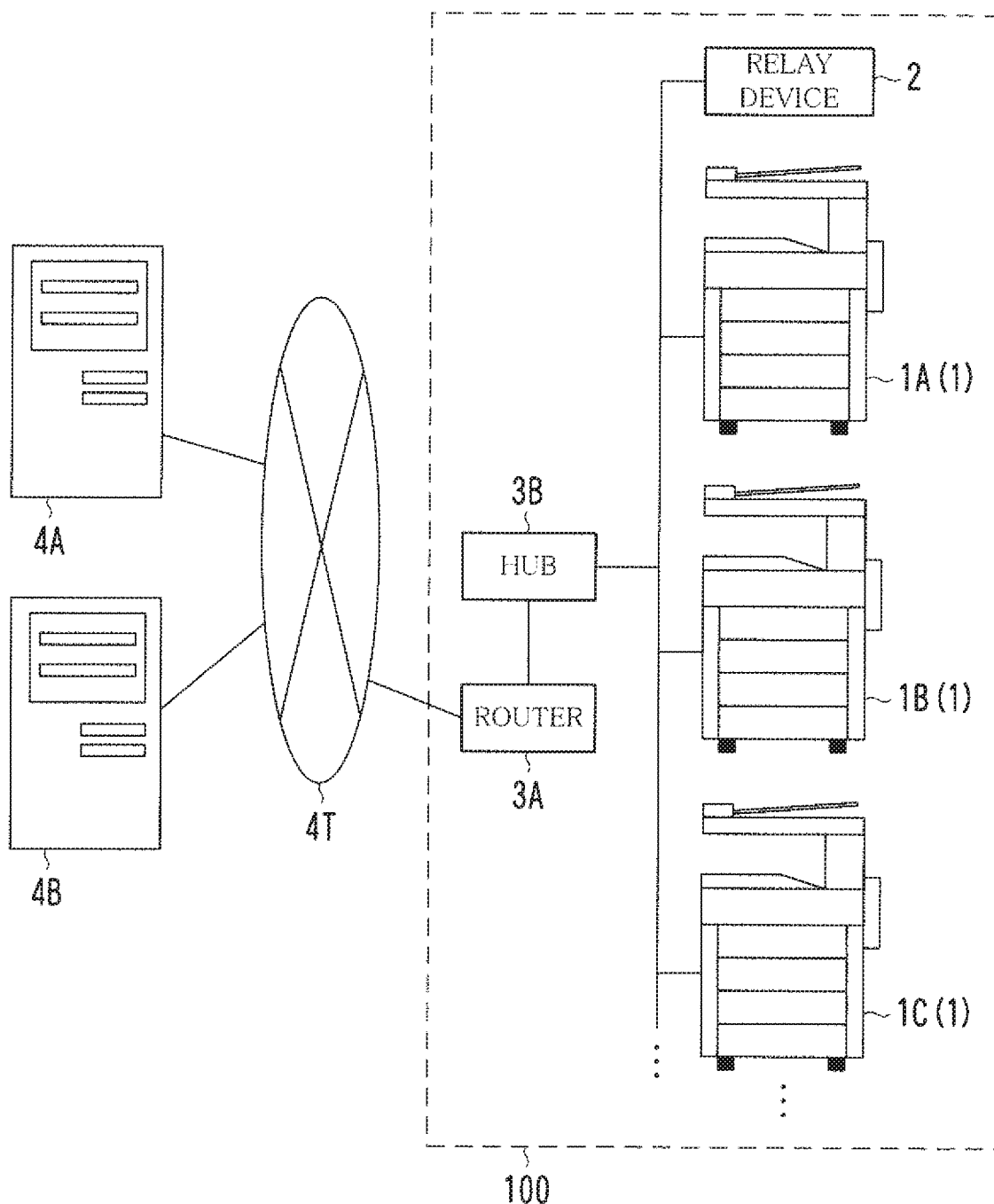
FIG. 1 is a diagram showing an example of the overall configuration of an application system.
Figure 2:
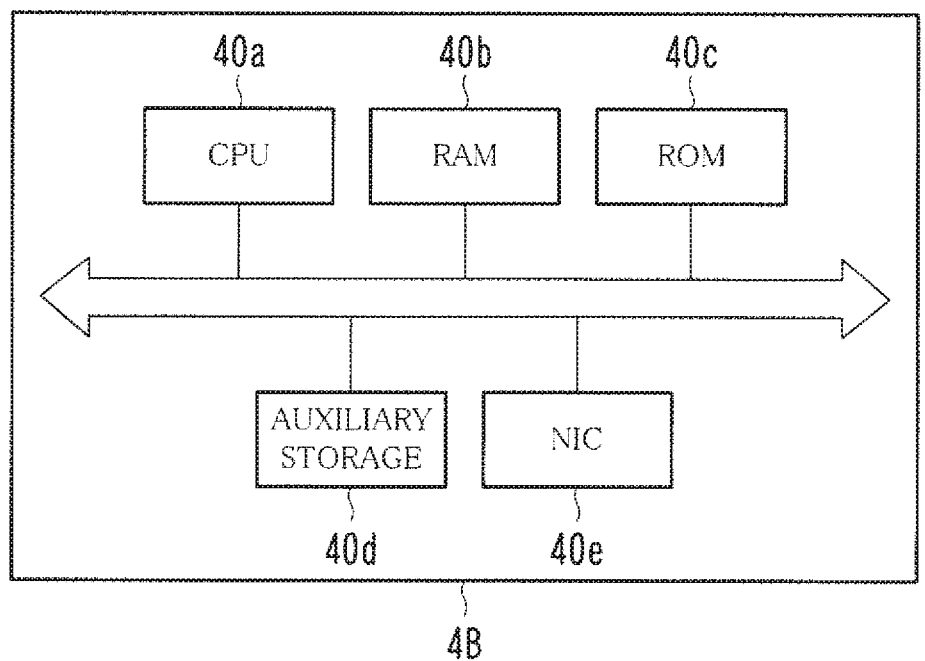
FIG. 2 is a diagram showing an example of the hardware configuration of a management server.
Figure 3:
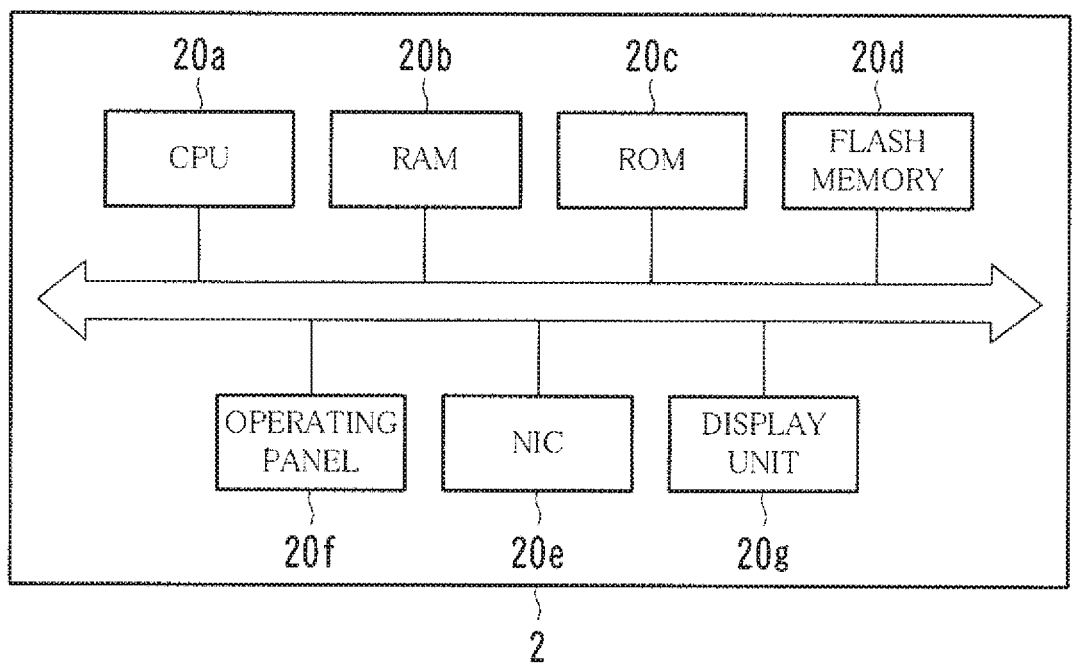
FIG. 3 is a diagram showing an example of the hardware configuration of a relay device.
Figure 4:
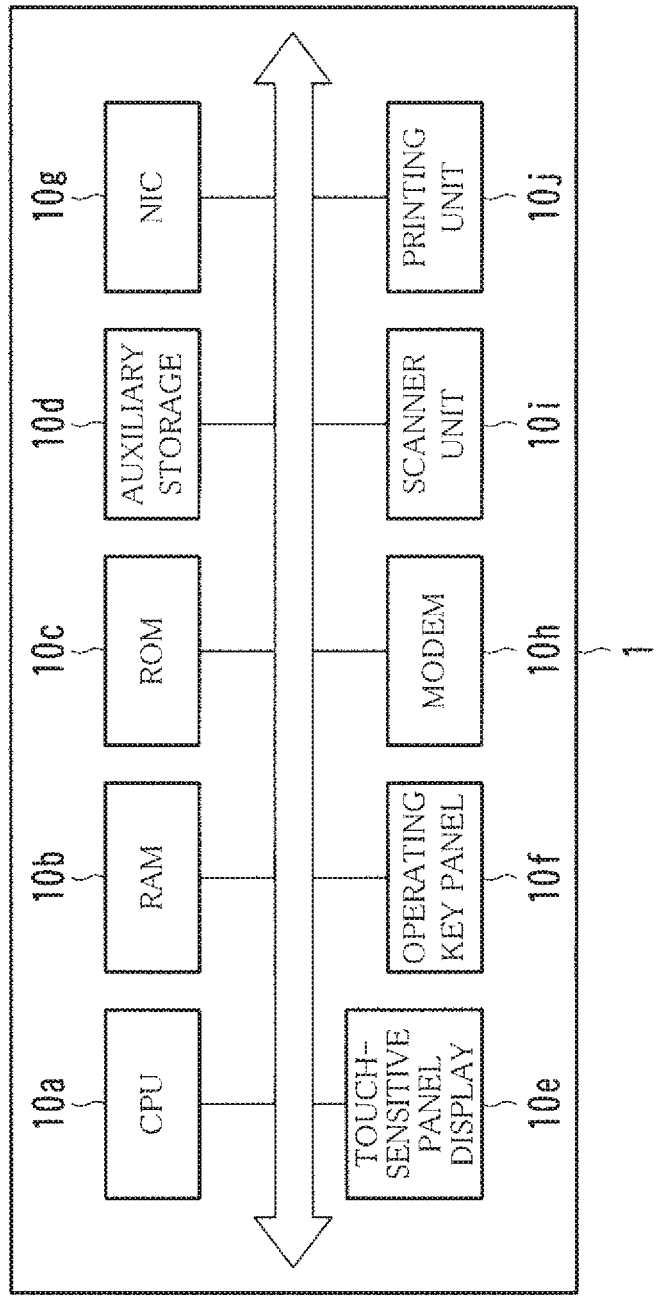
FIG. 4 is a diagram showing an example of the hardware configuration of an image forming apparatus.

FIG. 1 is a diagram showing an example of the overall configuration of an application system 5. FIG. 2 is a diagram showing an example of the hardware configuration of a management server 4B. FIG. 3 is a diagram showing an example of the hardware configuration of a relay device 2. FIG. 4 is a diagram showing an example of the hardware configuration of an image forming apparatus 1.

Referring to FIG. 1, the application system 5 is configured of an intranet 100, an application server 4A, the management server 4B, a communication line 4T, and so on. In the application system 5, the image forming apparatuses 1 and the application server 4A work in coordination to provide a user with a variety of services.

The intranet 100 is a Local Area Network (LAN) installed in an organization. The intranet 100 is configured of the image forming apparatuses 1, the relay device 2, a router 3A, a hub 3B, and so on.

The image forming apparatuses 1, the relay device 2, and the router 3A are connected to the hub 3B via a twisted pair cable, which enables communication therebetween via the hub 3B.

The router 3A is configured to perform communication with devices external to the intranet 100, e.g., the application server 4A and the management server 4B, via the communication line 4T. Examples of the communication line 4T include the Internet, a public line, and a dedicated line.

The router 3A has a function of firewall. The firewall function enables monitoring of communication between the individual devices of the intranet 100. The firewall function also keeps the devices of the intranet 100 safe from attacks and unauthorized access from outside. In this embodiment, access from the outside of the intranet 100 is strictly limited. In some cases, the firewall function is implemented by a device provided separately from the router 3A.

The foregoing configuration enables the devices of the intranet 100 to perform communication with one another, and further enables the devices of the intranet 100 and devices external thereto to perform communication under certain restrictions.

The application server 4A uses functions of the image forming apparatus 1 to provide the user with a variety of services. For example, the application server 4A causes the image forming apparatus 1 to print a document created by the user. The application server 4A also causes a smartphone or tablet computer of the user to display an address book registered in the image forming apparatus 1. The application server 4A is, for example, a so-called cloud server.

The management server 4B keeps a connection with a device which has a role as a gateway among the devices of the intranet 100 in order that the application server 4A and the image forming apparatus 1 always work in coordination to perform processing.

In this embodiment, the "gateway" is an application gateway. In particular, where the application server 4A and the image forming apparatus 1 work in coordination to perform processing, the gateway serves to connect the application server 4A and the image forming apparatus 1 with each other to relay communication therebetween.

Referring to FIG. 2, the management server 4B is configured of a Central Processing Unit (CPU) 40a, a Random Access Memory (RAM) 40b, a Read Only Memory (ROM) 40c, an auxiliary storage 40d, a Network Interface Card (NIC) 40e, and so on.

The NIC 40e performs communication with the application server 4A, the router 3A, and other devices in accordance with a protocol such as Transmission Control Protocol/Internet Protocol (TCP/IP).

The ROM 40c or the auxiliary storage 40d stores a connection program 40P (see FIG. 7) therein. The connection program 40P is to keep the connection with the intranet 100. The connection program 40P is loaded into the RAM 40b and executed by the CPU 40a. Examples of the auxiliary storage 40d include a hard disk drive and a Solid State Drive (SSD).

The relay device 2 functions as the gateway. Referring to FIG. 3, the relay device 2 is configured of a CPU 20a, a RAM 20b, a ROM 20c, a flash memory 20d, an NIC 20e, an operating panel 20f, a display unit 20g, and so on. The relay device 2 is sometimes called a "PF" or a "platform".

The NIC 20e performs communication with the image forming apparatus 1, the router 3A, and so on in accordance with a protocol such as TCP/IP.

The operating panel 20f has, for example, keys for the user to enter a command or information to the relay device 2.

The display unit 20g displays a screen for presenting messages to the user and a screen for allowing the user to enter commands or information, for example.

The ROM 20c or the flash memory 20d stores a gateway program 20P (see FIG. 6) therein. The gateway program 20P is to implement the functions of the gateway.

The gateway program 20P is loaded into the RAM 20b and is executed by the CPU 20a.

The image forming apparatus 1 is an image processing apparatus generally called a "multifunction device" or a "Multi-Functional Peripheral (MFP)". The image forming apparatus 1 is an apparatus into which functions such as copying, PC printing, cloud printing, faxing, scanning, and a box function are integrated.

The PC printing function is to print an image onto paper based on image data received, for example, from a personal computer or a tablet computer of the intranet 100.

The cloud printing function is to receive image data through a server on the Internet to print an image onto paper.

According to the box function, each user is given a storage area called a "box" or a "personal box". The box function enables each user to save image data and so on to his/her storage area and to manage the image data and so on therein. The box corresponds to a "folder" or a "directory" in a personal computer.

Referring to FIG. 4, the image forming apparatus 1 is configured of a CPU 10a, a RAM 10b, a ROM 10c, an auxiliary storage 10d, a touch-sensitive panel display 10e, an operating key panel 10f, an NIC 10g, a modem 10h, a scanner unit 10i, a printing unit 10j, and so on.

The touch-sensitive panel display 10e displays, for example, a screen for presenting messages to the user, a screen for allowing the user to enter commands or information, or a screen for showing the results of processing executed by the CPU 10a, and so on. The touch-sensitive panel display 10e also sends a signal indicating a touched location to the CPU 10a.

The operating key panel 10f is a so-called hardware keyboard. The operating key panel 10f is provided with numeric keys, a start key, a stop key, and function keys.

The NIC 10g performs communication with a device such as the relay device 2 in accordance with a protocol such as TCP/IP.

The modem 10h sends/receives image data with a facsimile terminal in accordance with a protocol such as G3.

The scanner unit 10i optically reads an image recorded on a sheet placed on a platen glass to generate image data thereof.

The printing unit 10j prints, onto paper, the image captured by the scanner unit 10i and an image shown in image data sent from other devices.

The ROM 10c or the auxiliary storage 10d stores, therein, programs for implementing the foregoing functions including the copying function. The auxiliary storage 10d also stores, therein, a communication program 10P and a cooperative program 10Q (see FIG. 5).

The communication program 10P is to perform communication with the application server 4A via the gateway. The communication program 10P is also to function as the gateway when a trouble occurs in the relay device 2.

The cooperative program 10Q is to execute applied processing in conjunction with the application server 4A.

The programs are loaded into the RAM 10b and executed by the CPU 10a. Examples of the auxiliary storage 10d include a hard disk drive and an SSD.

Hereinafter, the image forming apparatuses 1 may be described separately as an "image forming apparatus 1A", an "image forming apparatus 1B", an "image forming apparatus 1C", . . . , and so on.

Usually, a session is established between the relay device 2 and the management server 4B. The image forming apparatus 1 and the application server 4A can perform processing in conjunction with each other via the session.

According to this embodiment, even when a trouble occurs in the relay device 2, the application server 4A and the image forming apparatus 1 can work in coordination to perform processing. Hereinafter, the mechanism thereof is described below.

Figure 5:
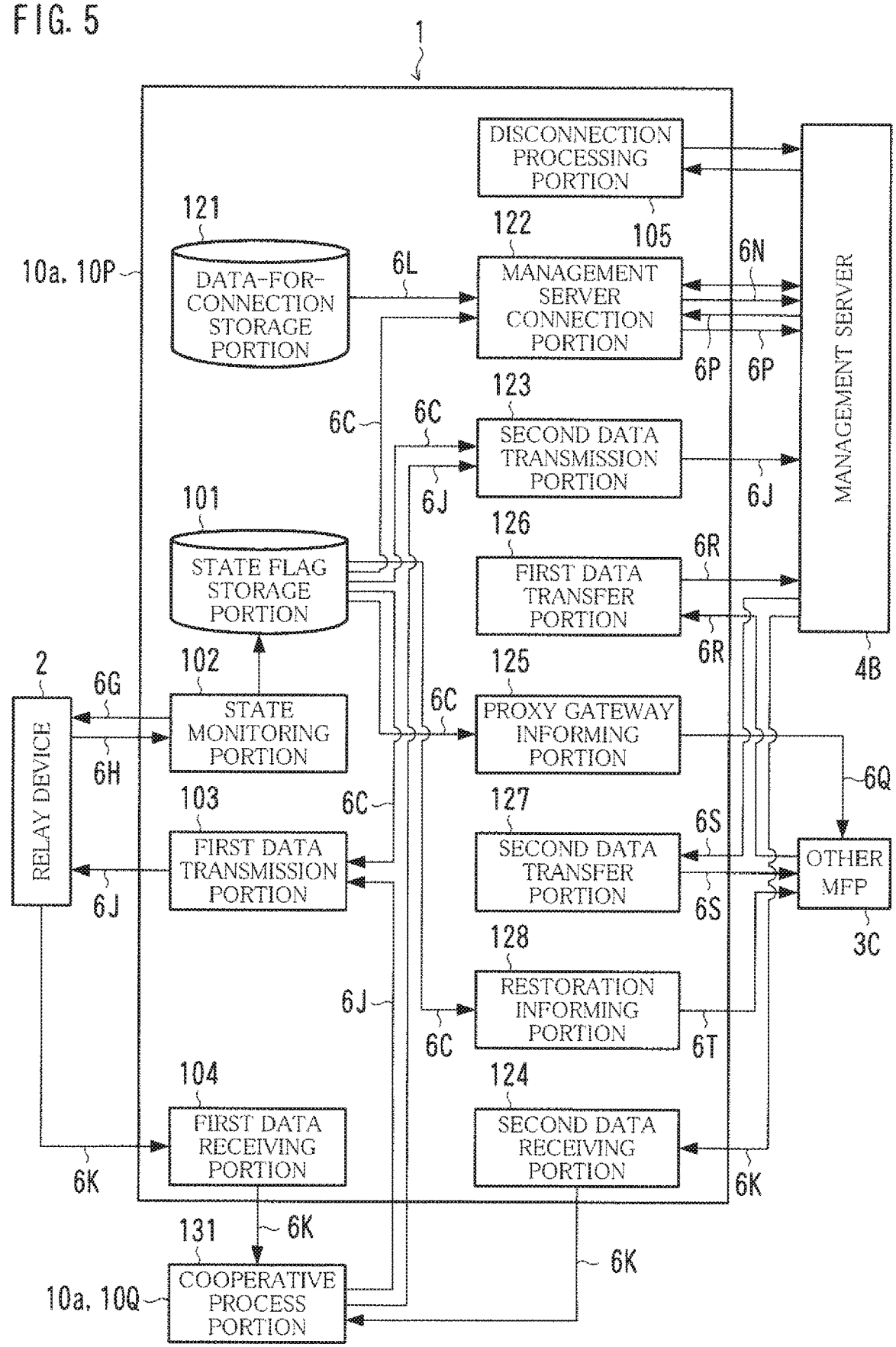
FIG. 5 is a diagram showing an example of the functional configuration of an image forming apparatus.
Figure 6:
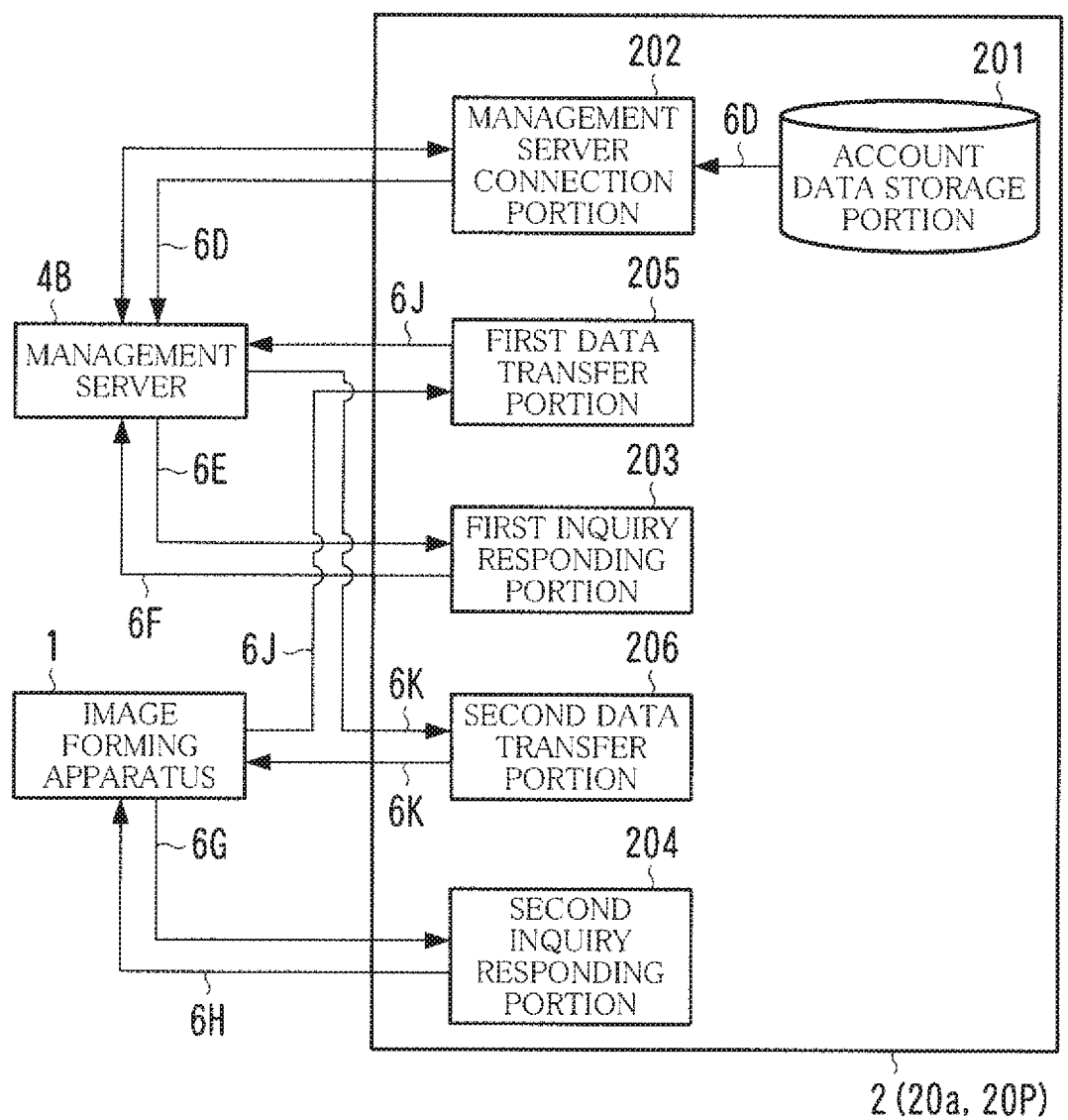
FIG. 6 is a diagram showing an example of the functional configuration of a relay device.
Figure 7:
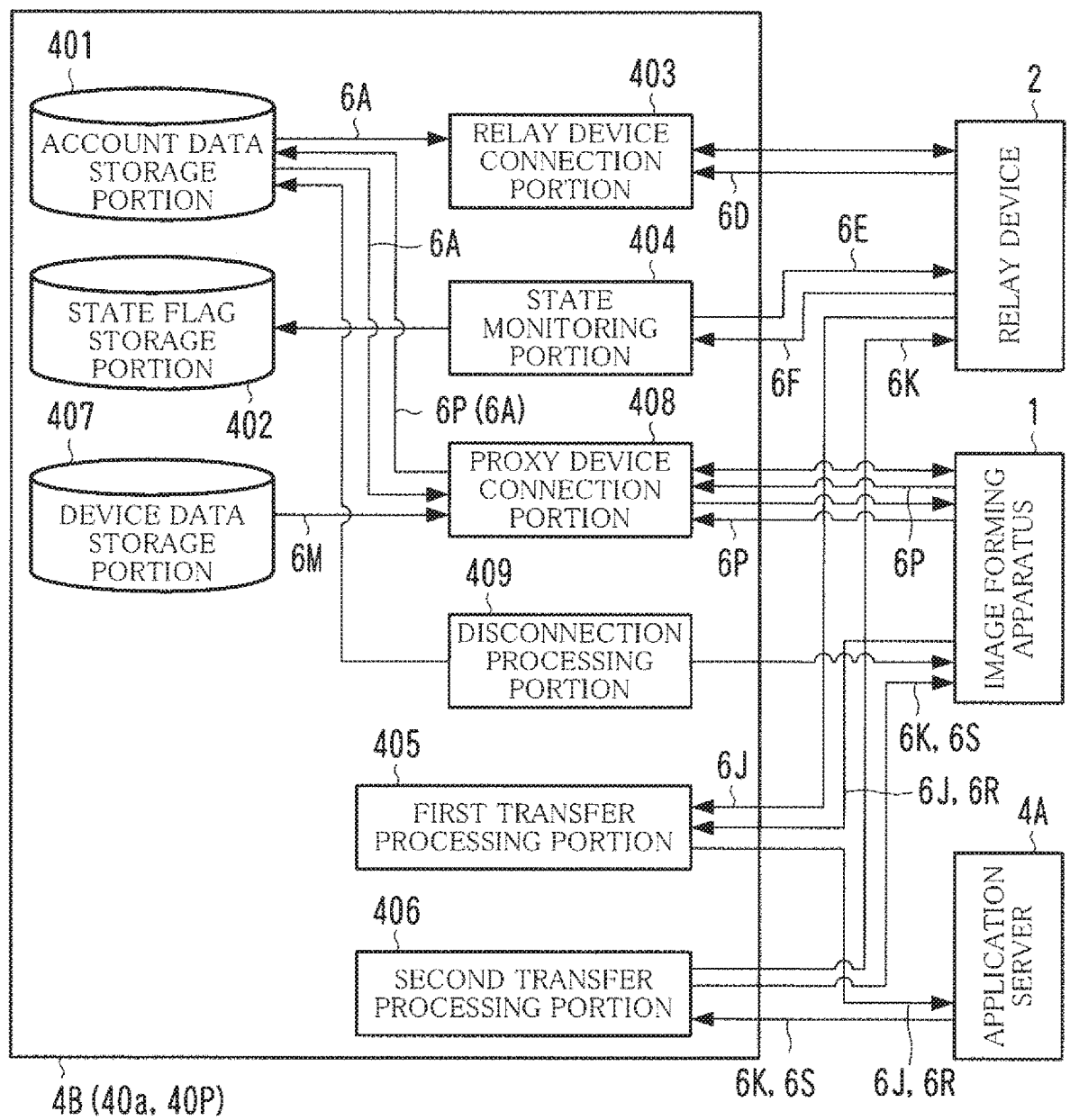
FIG. 7 is a diagram showing an example of the functional configuration of a management server.

FIG. 5 is a diagram showing an example of the functional configuration of the image forming apparatus 1. FIG. 6 is a diagram showing an example of the functional configuration of the relay device 2. FIG. 7 is a diagram showing an example of the functional configuration of the management server 4B.

The communication program 10P implements, in the image forming apparatus 1, the functions of a state flag storage portion 101, a state monitoring portion 102, a first data transmission portion 103, a first data receiving portion 104, a disconnection processing portion 105, a data-for-connection storage portion 121, a management server connection portion 122, a second data transmission portion 123, a second data receiving portion 124, a proxy gateway informing portion 125, a first data transfer portion 126, a second data transfer portion 127, a restoration informing portion 128, and so on, all of which are shown in FIG. 5. The cooperative program 10Q implements the function of a cooperative process portion 131 in the image forming apparatus 1.

The gateway program 20P implements, in the relay device 2, the functions of an account data storage portion 201, a management server connection portion 202, a first inquiry responding portion 203, a second inquiry responding portion 204, a first data transfer portion 205, a second data transfer portion 206, and so on, all of which are shown in FIG. 6.

The connection program 40P implements, in the management server 4B, the functions of an account data storage portion 401, a state flag storage portion 402, a relay device connection portion 403, a state monitoring portion 404, a first transfer processing portion 405, a second transfer processing portion 406, a device data storage portion 407, a proxy device connection portion 408, a disconnection processing portion 409, and so on, all of which are shown in FIG. 7.

The image forming apparatus 1 has a normal mode and an abnormal mode as gateway-related modes.

The normal mode is set for the case where the relay device 2 operates properly as the gateway. The abnormal mode is set for the case where the relay device 2 does not operate properly as the gateway. The management server 4B also has the normal mode and the abnormal mode in the same manner as that in the image forming apparatus 1.

Hereinafter, the processing by the individual portions shown in FIGS. 5-7 shall be described, the descriptions being broadly divided into a case where the relay device 2 operates properly, a case where a problem arises in the relay device 2, and a case where the relay device 2 is restored.

[Case Where the Relay Device 2 Operates Properly]

With the management server 4B, the account data storage portion 401 stores, in advance, account data 6A for each of accounts of organizations which use the management server 4B. The account data 6A indicates an account code for identifying the corresponding organization and a password for authenticating the corresponding organization.

The state flag storage portion 402 stores, therein, a state flag 6B which shows whether or not the relay device 2 operates properly. The state flag 6B having a value of "1" means that the relay device 2 operates properly. The state flag 6B having a value of "0 (zero)" means that the relay device 2 does not operate properly, namely, a problem arises therein. Making the state flag 6B have a value of "1" turns the management server 4B into the normal mode. Making the state flag 6B have a value of "0 (zero)" turns the management server 4B into the abnormal mode.

With the image forming apparatus 1, the state flag storage portion 101 stores, therein, a state flag 6C which shows whether or not the relay device 2 operates properly. As with the case of the state flag 6B, the state flag 6C having a value of "1" means that the relay device 2 operates properly; and the state flag 6C having a value of "0 (zero)" means that a problem arises in the relay device 2. Making the state flag 6C have a value of "1" turns the image forming apparatus 1 into the normal mode. Making the state flag 6C have a value of "0 (zero)" turns the image forming apparatus 1 into the abnormal mode.

With the relay device 2, the account data storage portion 201 stores, therein, account data 6D in advance. The account data 6D indicates an account code and a password of an account of an organization which uses the relay device 2.

The management server connection portion 202 performs processing for connecting to the management server 4B in conjunction with the relay device connection portion 403 of the management server 4B as detailed below. The processing is performed when the relay device 2 is turned ON to start the gateway program 20P. The processing is performed also when the problem is solved to allow the relay device 2 to work properly as the gateway.

The management server connection portion 202 accesses the management server 4B based on a Uniform Resource Locator (URL) of the management server 4B to make a connection request to the management server 4B.

The management server connection portion 202 and the relay device connection portion 403 then establish a connection (session) between the relay device 2 and the management server 4B. The session may be established by a known method such as Secure Sockets Layer (SSL).

The individual portions of the relay device 2 and the individual portions of the management server 4B send/receive data with one another by using the session between the establishment of the session and disconnection thereof.

The management server connection portion 202 reads the account data 6D out of the account data storage portion 201, and sends, as a device trigger, the account data 6D to the management server 4B.

The relay device connection portion 403 receives the account data 6D and searches for account data 6A which shows the account code and the password indicated in the account data 6D. If such account data 6A is found out, then the relay device connection portion 403 determines that the relay device 2 is an authorized gateway to permit the relay device 2 to log into the management server 4B. Thereby, the application server 4A and the image forming apparatus 1 are permitted to exchange data therebetween via the relay device 2.

The state monitoring portion 404 continuously monitors whether or not the relay device 2 works properly. Monitoring is preferably performed by a known method. For example, the state monitoring portion 404 sends test data 6E to the relay device 2 at regular intervals (every 5-30 seconds, for example). The test data 6E is preferably sent by Packet Internet Groper (PING).

The first inquiry responding portion 203 of the relay device 2 receives the test data 6E, and sends response data 6F to the management server 4B in return.

If the response data 6F is received within a predetermined period of time since the test data 6E was sent, then the state monitoring portion 404 determines that the relay device 2 works properly. Otherwise, the state monitoring portion 404 determines that a problem arises in the relay device 2.

The test data 6E and the response data 6F are sent/received at regular intervals, so that the session is kept with no timeouts.

Where the normal mode is set, the state monitoring portion 102 monitors whether or not the relay device 2 works properly, for example, in the following manner. The state monitoring portion 102 sends, to the relay device 2, a test trigger (device trigger) 6G indicating the identifier (IP address or Media Access Control (MAC) address) of the subject image forming apparatus 1.

With the relay device 2, the second inquiry responding portion 204 receives the trigger 6G, and sends response data 6H, in return, to the image forming apparatus 1 from which the trigger 6G has been sent.

If the response data 6H is received within a predetermined period of time since the trigger 6G was sent, then the state monitoring portion 102 determines that the relay device 2 works properly. Otherwise, the state monitoring portion 102 determines that a problem arises in the relay device 2.

The state monitoring portion 102 may monitor the state of the relay device 2 by PING as with the state monitoring portion 404.

The session is established between the relay device 2 and the management server 4B and the log-in of the relay device 2 is successfully made. This enables the image forming apparatus 1 and the application server 4A to perform cooperative processing.

The cooperative process portion 131 of the image forming apparatus 1 performs various processing in conjunction with the application server 4A.

When the cooperative process portion 131 generates outgoing data 6J that is data to be sent to the application server 4A with the state flag 6C having a value of "1", namely, with the normal mode set, the first data transmission portion 103 sends the outgoing data 6J toward the application server 4A. At this time, the relay device 2 is selected as the gateway. Thus, the outgoing data 6J sent by the first data transmission portion 103 reaches the relay device 2.

The first data transfer portion 205 of the relay device 2 receives the outgoing data 6J from the image forming apparatus 1, and then, transfers the outgoing data 6J to the management server 4B.

The first transfer processing portion 405 of the management server 4B receives the outgoing data 6J from the gateway of the intranet 100 (relay device 2 herein), and then, transfers the outgoing data 6J to the application server 4A.

When receiving the outgoing data 6J, the application server 4A performs processing based on the outgoing data 6J.

The application server 4A sends data to be delivered to the image forming apparatus 1, so that the data reaches the management server 4B. The data is hereinafter referred to as "incoming data 6K".

The second transfer processing portion 406 of the management server 4B receives the incoming data 6K from the application server 4A, and then, transfers the incoming data 6K to the gateway of the intranet 100. The gateway herein is the relay device 2.

The second data transfer portion 206 of the relay device 2 receives the incoming data 6K from the management server 4B, and then, transfers the incoming data 6K to the image forming apparatus 1 which is the destination of the incoming data 6K.

The first data receiving portion 104 of the image forming apparatus 1 receives the incoming data 6K from the relay device 2, and then, delivers the incoming data 6K to the cooperative process portion 131. The cooperative process portion 131 then performs the processing based on the incoming data 6K.

The image forming apparatus 1 and the application server 4A establish a connection therebetween, and use a predetermined port number to send/receive data with each other. In order that the image forming apparatuses 1 send/receive data with the application server 4A around the same time, each of the image forming apparatuses 1 establish a connection with the application server 4A. For example, where the image forming apparatus 1A and the image forming apparatus 1B send/receive data with the application server 4A around the same time, a connection between the image forming apparatus 1A and the application server 4A and a connection between the image forming apparatus 1B and the application server 4A are established. The same is applied to the case where a problem occurs in the relay device 2.

As discussed above, the relay device 2 functions as a proxy server, specifically, sends/receives data with the application server 4A in place of the image forming apparatuses 1.

[Where a Problem Arises in the Relay Device 2]

FIG. 8 shows an example of proxy device data 6M.

The data-for-connection storage portion 121 of the image forming apparatus 1 stores therein gateway data 6L in advance. The gateway data 6L indicates an IP address and a serial number of the relay device 2.

Referring to FIG. 8, the device data storage portion 407 of the management server 4B stores, therein, the proxy device data 6M for each of the image forming apparatuses 1 capable of working as the gateway. The proxy device data 6M indicates an IP address and a device name (host name, for example) of the corresponding image forming apparatus 1 so as to correspond to an IP address and a serial number of the relay device 2 of the intranet 100 in which the corresponding image forming apparatus 1 is located.

With the management server 4B, where no response data 6F is sent from the relay device 2, the state monitoring portion 404 determines that a problem arises in the relay device 2, and updates the value of the state flag 6B with "0 (zero)".

With the image forming apparatus 1, where no response data 6H is sent from the relay device 2, the state monitoring portion 102 determines that a problem arises in the relay device 2, and updates the value of the state flag 6C with "0 (zero)". Thereby, the abnormal mode is set. The state monitoring portion 102 may stop monitoring by using the trigger 6G until the normal mode is set again.

The management server connection portion 122 performs processing for connecting to the management server 4B as described below in order that the subject image forming apparatus 1 functions as the gateway in place of the relay device 2.

The management server connection portion 122 accesses the management server 4B based on the URL of the management server 4B to send a connection request to the management server 4B.

In response to the value of the state flag 6C updated with "0 (zero)", the management server connection portion 122 and the proxy device connection portion 408 of the management server 4B establish a session between the image forming apparatus 1 and the management server 4B by a known method such as the SSL. Between the establishment of the session and disconnection thereof, the individual portions of the image forming apparatus 1 and the individual portions of the management server 4B use the session to send/receive data with one another.

The management server connection portion 122 reads the gateway data 6L out of the data-for-connection storage portion 121. The management server connection portion 122 then generates connection request data 6N indicating the IP address and the serial number shown in the gateway data 6L and the IP address and the device name of the subject image forming apparatus 1. The management server connection portion 122 sends the connection request data 6N to the management server 4B.

The proxy device connection portion 408 receives the connection request data 6N. The proxy device connection portion 408 then searches, in the device data storage portion 407, for the proxy device data 6M that indicates the IP address and the device name of the image forming apparatus 1 shown in the connection request data 6N and the IP address and the serial number of the relay device 2. If that proxy device data 6M is found out by the search, then the proxy device connection portion 408 determines that the image forming apparatus 1 which is the transmission source of the connection request data 6N is an authorized device, and issues a temporary account code and password.

The proxy device connection portion 408 sends account data 6P that indicates the temporary account code and password thus issued to the image forming apparatus 1. The proxy device connection portion 408 temporarily stores the account data 6P as the account data 6A into the account data storage portion 401.

The management server connection portion 122 receives the account data 6P and sends the account data 6P as the device trigger to the management server 4B.

The proxy device connection portion 408 receives the account data 6P. The proxy device connection portion 408 then searches for the account data 6A that indicates the account code and the password shown in the account data 6P. If that account data 6A is found out by the search, then the proxy device connection portion 408 determines that the image forming apparatus 1 which is the transmission source of the account data 6P is an authorized gateway, and allows that image forming apparatus 1 to log into the management server 4B.

The session is established between the image forming apparatus 1 and the management server 4B and the log-in of the image forming apparatus 1 is successfully made. This enables the image forming apparatus 1 and the application server 4A to perform the cooperative processing. Thereafter, in order to keep the session, the image forming apparatus 1 and the management server 4B send/receive test data therebetween at regular intervals.

When the cooperative process portion 131 generates the outgoing data 6J with the state flag 6C having a value of "0 (zero)", namely, with the abnormal mode set, the second data transmission portion 123 of the image forming apparatus 1 sends the outgoing data 6J toward the application server 4A. In the abnormal mode, the subject image forming apparatus 1 functions as the gateway. Thus, the outgoing data 6J is sent to the management server 4B without passing through the relay device 2.

The first transfer processing portion 405 of the management server 4B receives the outgoing data 6J from the gateway of the intranet 100 (image forming apparatus 1 herein), and then, transfers the outgoing data 6J to the application server 4A as with the case of the normal mode.

As with the case of the normal mode, the application server 4A receives the outgoing data 6J to perform the processing based on the outgoing data 6J. The application server 4A sends the incoming data 6K, which then reaches the management server 4B.

The second transfer processing portion 406 of the management server 4B receives the incoming data 6K from the application server 4A, and then, transfers the incoming data 6K to the gateway of the intranet 100. The gateway herein is the image forming apparatus 1.

The second data receiving portion 124 of the image forming apparatus 1 receives the incoming data 6K. If the destination of the incoming data 6K is the subject image forming apparatus 1, then the second data receiving portion 124 conveys the incoming data 6K to the cooperative process portion 131. The cooperative process portion 131 performs the processing based on the incoming data 6K.

In the meantime, an image forming apparatus having no gateway function is located in the intranet 100 in some cases. Such an image forming apparatus is hereinafter referred to as an "image forming apparatus 3C".

Where the relay device 2 works properly, the image forming apparatus 3C uses the relay device 2 as the gateway to perform communication with the application server 4A in the same manner as that in the image forming apparatus 1.

Where a problem arises in the relay device 2, the image forming apparatus 3C preferably uses, as the gateway, any one of the image forming apparatuses 1 instead of the relay device 2 to perform communication. The following description provides an example in which the image forming apparatus 1A is used as the gateway.

With the image forming apparatus 1A, the proxy gateway informing portion 125, the first data transfer portion 126, and the second data transfer portion 127 perform the processing as described below in order to function as the gateway of the image forming apparatus 3C.

When the mode is switched to the abnormal mode, the proxy gateway informing portion 125 sends, to the image forming apparatus 3C, proxy gateway data 6Q showing the IP address of the subject image forming apparatus 1A. Thereby, the image forming apparatus 3C is informed which device is to function as the gateway in place of the relay device 2.

Every time the mode is switched to the abnormal mode, the proxy gateway informing portion 125 may search for the image forming apparatus having no gateway function as the image forming apparatus 3C. Alternatively, the proxy gateway informing portion 125 may store, in advance, the identifier of the image forming apparatus 3C, e.g., the IP address thereof.

The image forming apparatus 3C performs communication with the application server 4A and the management server 4B with the transmission source of the proxy gateway data 6Q functioning as the gateway in the same manner as discussed above between the receipt of the proxy gateway data 6Q and the receipt of restoration notification data 6T described later.

When receiving outgoing data 6R to be delivered to the application server 4A from the image forming apparatus 3C, the first data transfer portion 126 transfers the outgoing data 6R to the management server 4B. When receiving data for authenticating the image forming apparatus 3C from the image forming apparatus 3C, the first data transfer portion 126 transfers the data to the management server 4B.

With the management server 4B, the first transfer processing portion 405 receives the outgoing data 6R from the gateway of the intranet 100 (image forming apparatus 1A herein), and transfers the outgoing data 6R to the application server 4A.

The application server 4A receives the outgoing data 6R and performs the processing based on the outgoing data 6R.

The application server 4A sends data to be delivered to the image forming apparatus 3C, which then reaches the management server 4B. Such data is hereinafter referred to as "incoming data 6S".

With the management server 4B, the second transfer processing portion 406 receives the incoming data 6S from the application server 4A, and transfers the incoming data 6S to the gateway of the intranet 100 (image forming apparatus 1A herein).

The second data transfer portion 127 of the image forming apparatus 1A receives the incoming data 6S from the management server 4B, and transfers the incoming data 6S to the image forming apparatus 3C that is the destination of the incoming data 6S.

The state monitoring portion 404 of the management server 4B sends the test data 6E toward the relay device 2 at regular intervals. At this time, the state monitoring portion 404 preferably uses the session with any one of the image forming apparatuses 1.

[Where the Relay Device 2 is Restored]

When the problem in the relay device 2 is solved and the communication among the relay device 2, the image forming apparatus 1, and the management server 4B becomes possible, the individual portions of the relay device 2 perform the foregoing processing appropriately. To be specific, the portions of the relay device 2 perform the processing for establishing a session with the management server 4B, and the processing for relaying data to be sent/received between the image forming apparatus 1 and the application server 4A.

Where the response data 6F is sent from the relay device 2, the state monitoring portion 404 of the management server 4B determines that the relay device 2 is restored and updates the value of the state flag 6B with "1".

In response to the update, the disconnection processing portion 409 disconnects the sessions from the image forming apparatuses 1 and deletes the account data 6P of each of the image forming apparatuses 1 from the account data storage portion 401.

With the image forming apparatus 1, when the response data 6H is sent from the relay device 2, the state monitoring portion 102 determines that the relay device 2 is restored and updates the value of the state flag 6C with "1".

Where stopping the monitoring, the state monitoring portion 102 may determine that the relay device 2 is restored by detecting the disconnection of the session from the management server 4B. The state monitoring portion 102 may update the value of the state flag 6C with "1". Then, the state monitoring portion 102 may resume the monitoring.

Alternatively, before the session is disconnected, the disconnection processing portion 409 may inform the image forming apparatus 1 that the relay device 2 is restored. In such a case, the state monitoring portion 102 may update the value of the state flag 6C with "1" in response to the information. The disconnection of the session may be performed by the disconnection processing portion 105.

In response to the update of the value of the state flag 6C with "1", the second data transmission portion 123, the second data receiving portion 124, the first data transfer portion 126, and the second data transfer portion 127 stop.

After that, the first data transmission portion 103 and the first data receiving portion 104 perform the processing as discussed above.

Where the relay device 2 functions as the gateway of the image forming apparatus 3C, the restoration informing portion 128 sends, to the image forming apparatus 3C, the restoration notification data 6T indicating that the relay device 2 is restored.

The image forming apparatus 3C receives the restoration notification data 6T. The image forming apparatus 3C then uses again the relay device 2 as the gateway to perform communication with the application server 4A in the same manner as that in the image forming apparatus 1.

Figure 9:
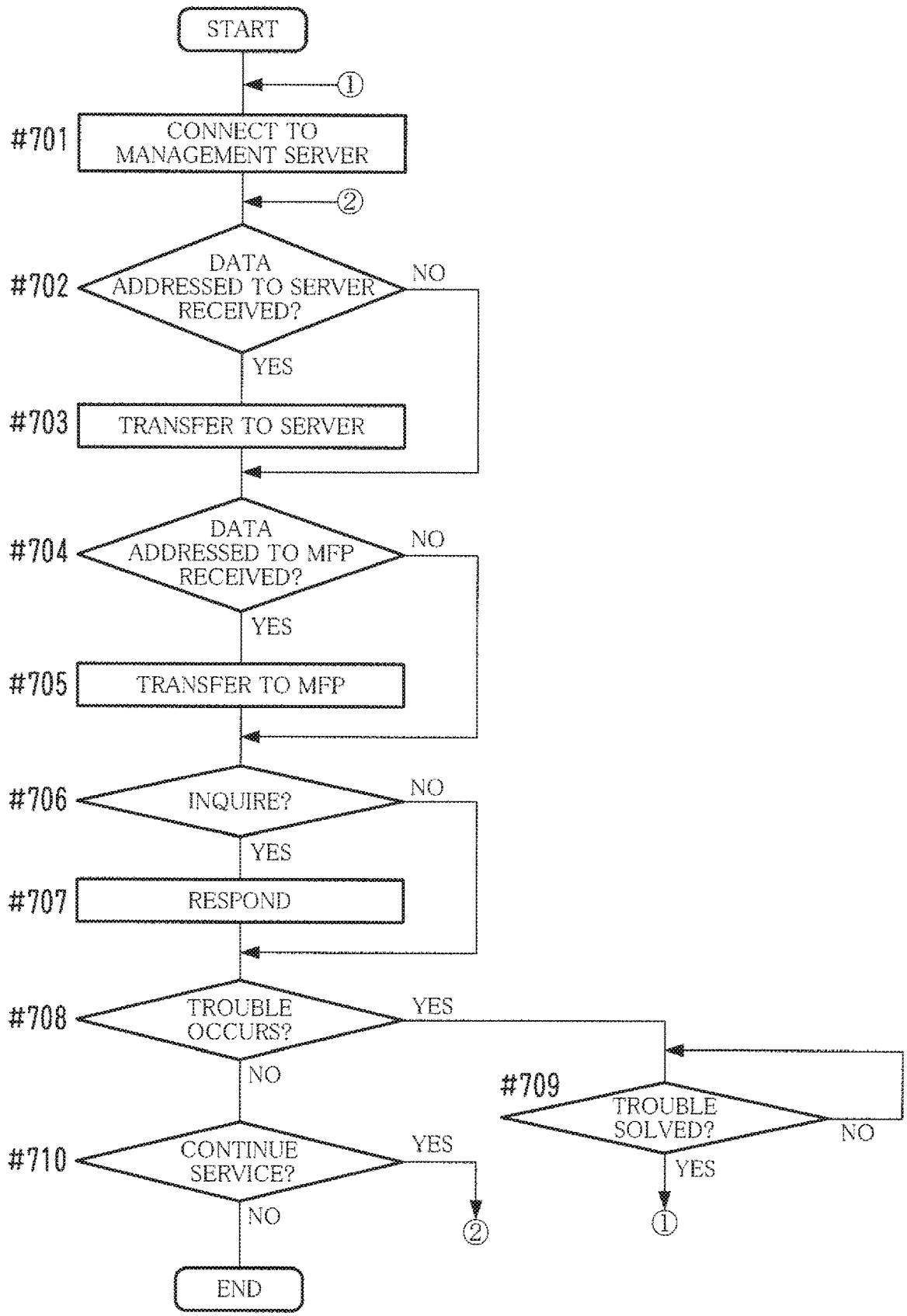
FIG. 9 is a flowchart depicting an example of the flow of the entire processing by a relay device.
Figure 10:
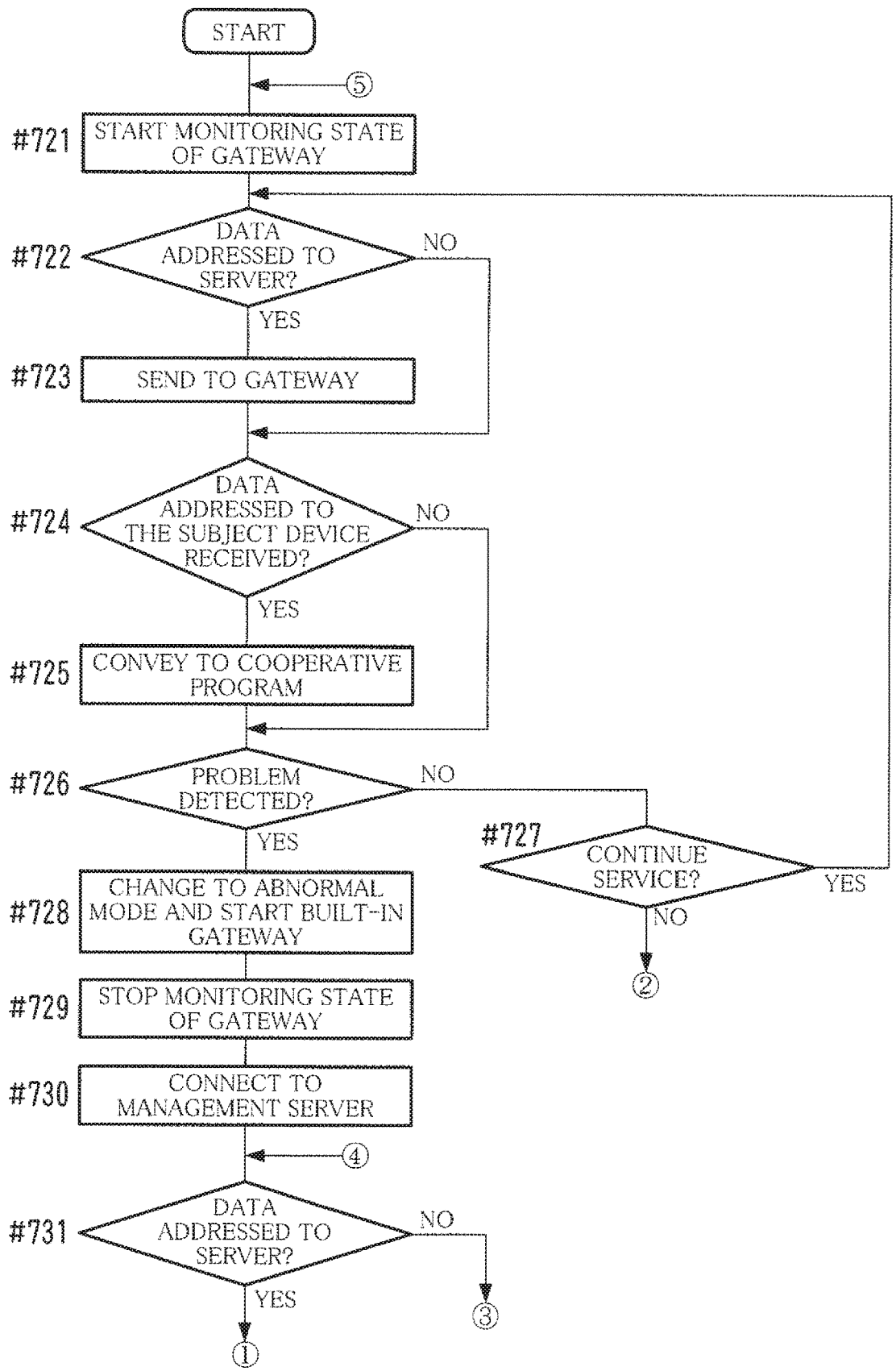
FIG. 10 is a flowchart depicting an example of the flow of the entire processing by an image forming apparatus.
Figure 11:
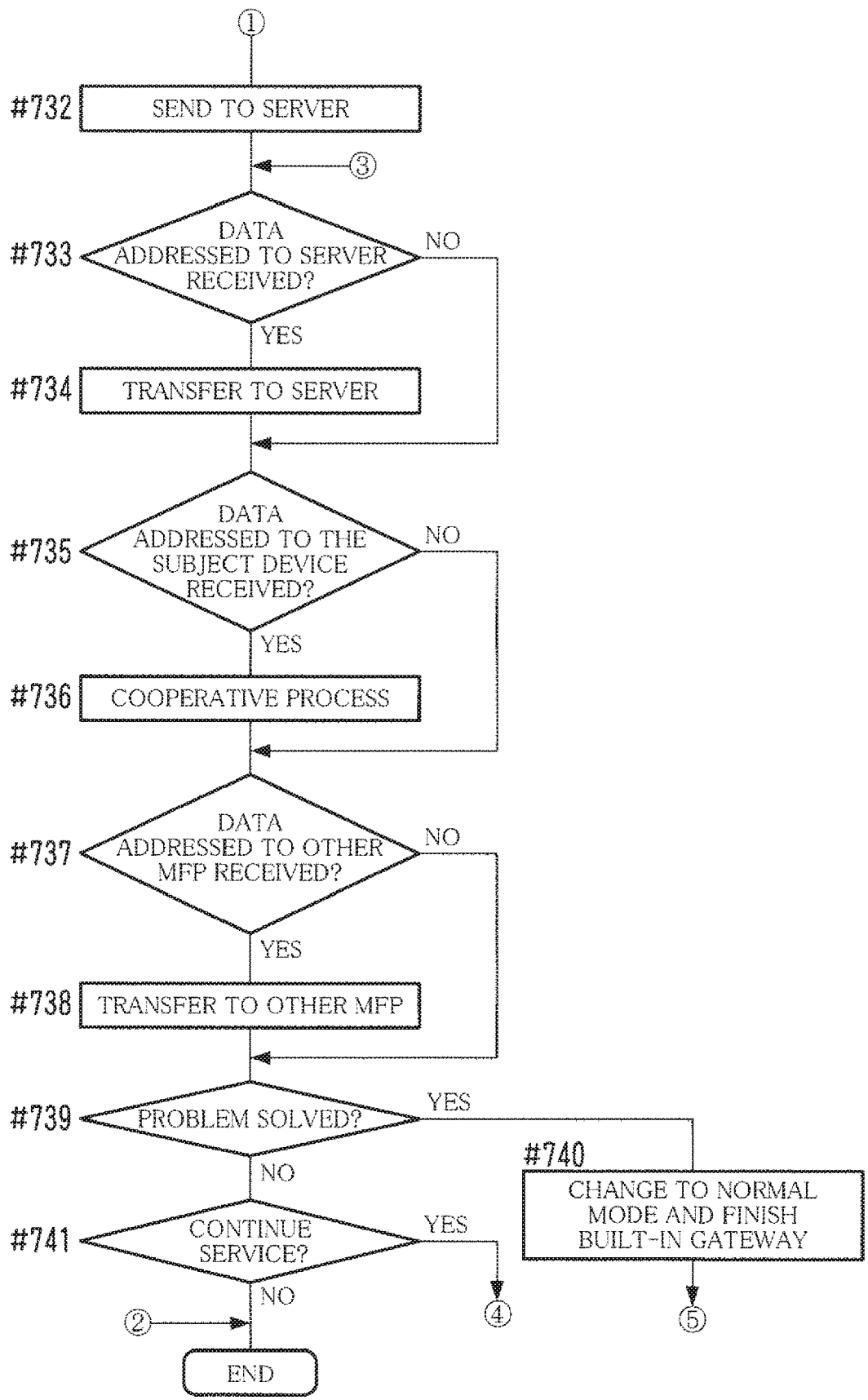
FIG. 11 is a flowchart depicting an example of the flow of the entire processing by an image forming apparatus.
Figure 12:
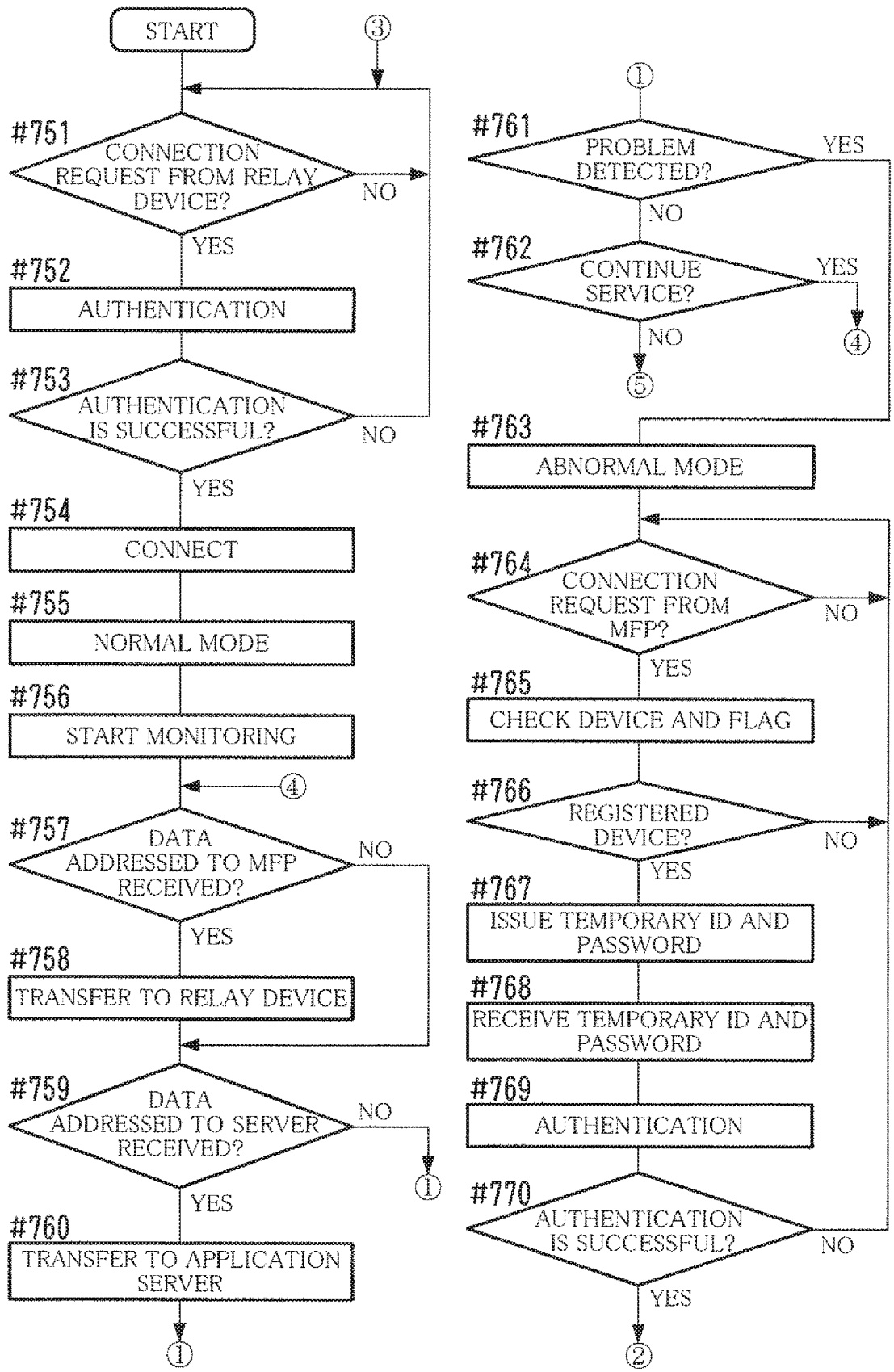
FIG. 12 is a flowchart depicting an example of the flow of the entire processing by a management server.
Figure 13:
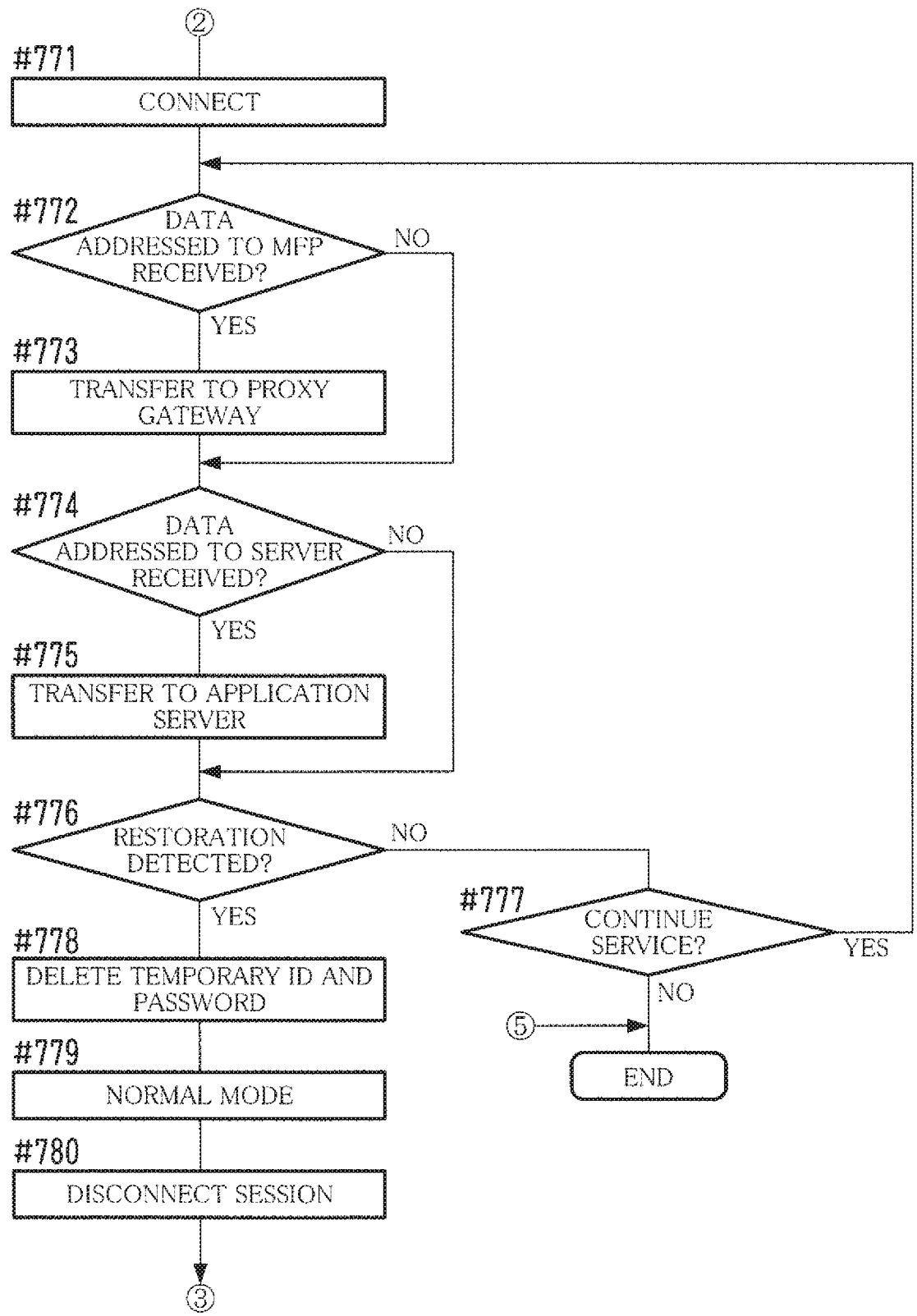
FIG. 13 is a flowchart depicting an example of the flow of the entire processing by a management server.

FIG. 9 is a flowchart depicting an example of the flow of the entire processing by the relay device 2. FIGS. 10 and 11 are flowcharts depicting an example of the flow of the entire processing by the image forming apparatus 1. FIGS. 12 and 13 are flowcharts depicting an example of the flow of the entire processing by the management server 4B.

The description goes on to the flow of the entire processing by each of the image forming apparatus 1, the relay device 2, and the management server 4B. The description is provided with reference to the flowcharts.

The relay device 2 performs the processing in accordance with the gateway program 20P in the steps as depicted in FIG. 9.

When the power is turned ON and the gateway program 20P starts, the relay device 2 accesses the management server 4B to establish a session with the management server 4B (Step #701 of FIG. 9).

After the session is established, the relay device 2 receives the outgoing data 6J from the image forming apparatus 1 (YES in Step #702) to transfer the outgoing data 6J to the management server 4B (Step #703).

The relay device 2 receives the incoming data 6K from the management server 4B (YES in Step #704) to transfer the incoming data 6K to the image forming apparatus 1 which is the destination of the incoming data 6K (Step #705).

The relay device 2 receives the test data 6E or the trigger 6G (YES in Step #706), and sends, in return, the response data 6F or the response data 6H to the management server 4B or the image forming apparatus 1 that is the transmission source of the test data 6E or the trigger 6G (Step #707).

When a problem arises in the relay device 2 (YES in Step #708) and after that the problem is solved (YES in Step #709), the relay device 2 accesses the management server 4B again to establish a session with the management server 4B (Step #701).

While continuing the gateway service (NO in Step #708 and YES in Step #710), the relay device 2 performs the processing of Step #703, Step #705, and Step #707 appropriately.

The image forming apparatus 1 performs the processing in accordance with the communication program IOP in the steps as depicted in FIGS. 10 and 11. Further, the image forming apparatus 1 executes the cooperative program 10Q in parallel with the communication program 10P, which enables the cooperative processing with the application server 4A.

When the power is turned ON and the communication program 10P starts, the image forming apparatus 1 starts monitoring the state of the relay device 2 (Step #721 of FIG. 10). Hereinafter, the example is described in which the relay device 2 works properly at this point in time. Thus, the normal mode is set in the image forming apparatus 1.

Where data to be delivered to the application server 4A (outgoing data 6J) is generated based on the cooperative program 10Q (YES in Step #722), the image forming apparatus 1 sends the outgoing data 6J to the relay device 2 (Step #723).

The image forming apparatus 1 receives the incoming data 6K from the relay device 2 (YES in Step #724), and conveys the incoming data 6K to the cooperative program 10Q (Step #725). The image forming apparatus 1 then uses the incoming data 6K to perform the cooperative processing based on the cooperative program 10Q.

While being put in the normal mode and continuing the communication program 10P (NO in Step #726 and YES in Step #727), the image forming apparatus 1 performs the processing of Step #723 and the processing of Step #725 appropriately.

When detecting that a problem arises in the relay device 2 (YES in Step #726), the image forming apparatus 1 switches the mode to the abnormal mode (Step #728). This starts the gateway built in the image forming apparatus 1.

The image forming apparatus 1 stops monitoring the relay device 2 (Step #729), and accesses the management server 4B to establish a session with the management server 4B (Step #730). The image forming apparatus 1 then functions as the gateway.

If data to be delivered to the application server 4A (outgoing data 6J) is generated by the cooperative program 10Q (YES in Step #731), then the image forming apparatus 1 uses the gateway function of the subject image forming apparatus 1 to send the outgoing data 6J to the management server 4B (Step #732 of FIG. 11).

Where receiving data to be sent to the application server 4A (outgoing data 6R) from the image forming apparatus 3C (YES in Step #733), the image forming apparatus 1 transfers the outgoing data 6R to the management server 4B (Step #734).

Where receiving the incoming data 6K to be sent to the subject image forming apparatus 1 from the management server 4B (YES in Step #735), the image forming apparatus 1 conveys the incoming data 6K to the cooperative program 10Q (Step #736). The cooperative processing is performed by using the incoming data 6K based on the cooperative program 10Q.

Where receiving data to be delivered to the image forming apparatus 3C (incoming data 6S) from the management server 4B (YES in Step #737), the image forming apparatus 1 transfers the incoming data 6S to the image forming apparatus 3C (Step #738).

While continuing the communication program 10P and being put in the abnormal mode (NO in Step #739 and YES in Step #741), the image forming apparatus 1 performs the processing of Step #732, the processing of Step #734, the processing of Step #736, and the processing of Step #738 appropriately.

Where the problem in the relay device 2 is solved (YES in Step #739), the image forming apparatus 1 stops the gateway function (Step #740) and the processing goes back to Step #721 and the image forming apparatus 1 performs the processing for normal mode.

The management server 4B performs the processing based on the connection program 40P in the steps as depicted in FIGS. 12 and 13.

Where being accessed from the relay device 2 for connection request (YES in Step #751 of FIG. 12), the management server 4B receives the account data 6D from the relay device 2 and performs authentication on the relay device 2 (Step #752).

Where the relay device 2 is successfully authenticated (YES in Step #753), the management server 4B establishes a session with the relay device 2 (Step #754). Thereby, the relay device 2 and the management server 4B are connected to each other.

The management server 4B turns the mode into the normal mode (Step #755) to start monitoring the state of the relay device 2 (Step #756).

In the normal mode, the management server 4B receives data to be delivered to the image forming apparatus 1 (incoming data 6K, for example) from the application server 4A (YES in Step #757), and transfers the incoming data 6K to the relay device 2 (Step #758).

Where the relay device 2 receives data to be delivered to the application server 4A (outgoing data 6J, for example) (YES in Step #759), the management server 4B transfers the outgoing data 6J to the application server 4A (Step #760).

While being put in the normal mode and continuing the connection program 40P (NO in Step #761 and YES in Step #762), the management server 4B performs the processing of Step #758 and the processing of Step #760 appropriately.

Where detecting that a problem arises in the relay device 2 (YES in Step #761), the management server 4B switches the mode to the abnormal mode (Step #763).

When being accessed from the image forming apparatus 1 and receiving the connection request data 6N (YES in Step #764), the management server 4B checks whether or not the accessing image forming apparatus 1 is registered in advance, and whether or not the mode is the abnormal mode (Step #765). Where the accessing image forming apparatus 1 is registered in advance and the abnormal mode is set (YES in Step #766), the management server 4B issues a temporary account code and password (account data 6P) to the accessing image forming apparatus 1 (Step #767).

Thereafter, when receiving the account data 6P from the accessing image forming apparatus 1 (Step #768), the management server 4B performs authentication on the accessing image forming apparatus 1 (Step #769).

Where the accessing image forming apparatus 1 is successfully authenticated (YES in Step #770), the management server 4B establishes a session with the accessing image forming apparatus 1 (Step #771 of FIG. 13). Thereby, the accessing image forming apparatus 1 and the management server 4B are connected to each other.

The processing of Step #764 through Step #771 is performed separately for each of the image forming apparatuses 1.

The management server 4B receives data to be delivered to the image forming apparatus 1 (incoming data 6K, for example) from the application server 4A (YES in Step #772), and transfers the incoming data 6K to the gateway, i.e., that image forming apparatus 1 (Step #773). When receiving data to be delivered to the image forming apparatus 3C, the management server 4B also transfers the data to the gateway.

The management server 4B receives data to be delivered to the application server 4A (outgoing data 6J, for example) from the image forming apparatus 1 (YES in Step #774), and transfers the outgoing data 6J to the application server 4A (Step #775).

While being put in the abnormal mode and continuing the connection program 40P (NO in Step #776 and YES in Step #777), the management server 4B performs the processing of Step #773 and the processing of Step #775 appropriately.

The management server 4B detects that the relay device 2 is restored (YES in Step #776). The management server 4B then deletes the temporary account code and password (Step #778), and switches the mode to the normal mode (Step #779). The management server 4B then disconnects the session from each of the image forming apparatuses 1 (Step #780). Before the disconnection, the management server 4B may inform each of the image forming apparatuses 1 that the relay device 2 is restored.

After that, the processing goes back to Step #751 and the management server 4B waits for the relay device 2 to access the management server 4B.

According to this embodiment, even when the relay device 2 does not function as the gateway, a device external to the intranet 100 is capable of accessing a device within the intranet 100. For example, even when the relay device 2 does not function as the gateway, the application server 4A or the management server 4B on the Internet is capable of accessing the image forming apparatus 1.

In this embodiment, the case is described in which the intranet 100 is a LAN. Instead of this, however, the intranet 100 may be a Virtual Private Network (VPN).

In this embodiment, the application server 4A performs communication with the individual devices of the intranet 100 via the management server 4B. Instead of this, the functions of the management server 4B may be provided in the application server 4A, so that the communication with the individual devices of the intranet 100 may be performed without the management server 4B.

In this embodiment, where a problem arises in the relay device 2, each of the image forming apparatuses 1 works as the gateway. Instead of this, any one or a plurality of the image forming apparatuses 1 may work as the gateway. The remaining image forming apparatuses 1 preferably send/receive data with the application server 4A via any of the gateways, as with the case of the image forming apparatus 3C.

In such a case, the management server 4B may send data for displaying a web page about a list of the image forming apparatuses 1 to a terminal of an administrator. The terminal displays the web page based on the data. Alternatively, where the management server 4B has a display, the display may be used to display the web page. When the administrator selects any one of the image forming apparatuses 1 as a device to work as the gateway, the management server 4B instructs the selected image forming apparatus 1 to function as the gateway.

The image forming apparatus 1 thus selected follows the instructions from the management server 4B to perform the processing for working as the gateway.

When a problem arises in the relay device 2, the management server 4B cannot give instructions to the image forming apparatus 1 via the session. In view of this, the instructions may be given via electronic mail or so.

Alternatively, where a problem arises in the relay device 2, any one of the image forming apparatuses 1 may display the web page. Where the administrator selects the image forming apparatus 1 displaying the web page as the device to work as the gateway, that image forming apparatus 1 performs processing for working as the gateway. Where another image forming apparatus 1 other than the image forming apparatus 1 displaying the web page is selected, that another image forming apparatus 1 is instructed to function as the gateway. That another image forming apparatus 1 performs the processing for working as the gateway.

When the relay device 2 is restored, the management server 4B may display the truth on the display of the management server 4B or on the terminal. Alternatively, the image forming apparatus 1 may display the truth.

In this embodiment, when the relay device 2 is restored, the image forming apparatus 1 finishes working as the gateway. Instead of this, even after the restoration, the image forming apparatus 1 may continue to work as the gateway.

In this embodiment, the image forming apparatus 1 determines that a problem occurs in the relay device 2 when no response data 6H is sent from the relay device 2. However, the image forming apparatus 1 may determine that a problem occurs in the relay device 2 also when the response data 6H indicates the occurrence of a problem. Similarly, the management server 4B may determine that a problem occurs in the relay device 2 also when the response data 6F indicates the occurrence of a problem.

In this embodiment, the image forming apparatus 1 sends a temporary account code and password (account data 6P) issued by the management server 4B to the management server 4B which performs authentication on the image forming apparatus 1. Instead of this, the image forming apparatus 1 may store, in advance, the account code and password (account data 6D) stored in the relay device 2. In such a case, the image forming apparatus 1 may send the account code and password (account data 6D) to the management server 4B which performs authentication on the image forming apparatus 1.

In some cases, the relay device 2 is replaced with a new relay device, so that the new relay device is used as the relay device 2. In such cases, the new relay device informs the management server 4B and the individual image forming apparatuses 1 of an IP address and a serial number of the new relay device. In other cases, the IP address of the relay device 2 is changed to a new IP address. In such cases, the relay device 2 informs the management server 4B and the individual image forming apparatuses 1 of the new IP address together with the serial number of the relay device 2.

The management server 4B updates the IP address and the serial number of the relay device 2 in the proxy device data 6M (see FIG. 8) of each of the image forming apparatuses 1 with the IP address and serial number thus informed. Each of the image forming apparatuses 1 updates the IP address and the serial number in the gateway data 6L with the IP address and serial number thus informed.

Thereafter, where a problem occurs in the new relay device, the management server 4B and the individual image forming apparatuses 1 use the post-update proxy device data 6M and the post-update gateway data 6L to perform the foregoing processing.

It is to be understood that the overall configuration of the application system 5, the image forming apparatus 1, the relay device 2, and the management server 4B, the constituent elements thereof, the content of the processing, the order of the processing, the structure of the data, and the like may be appropriately modified without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A printing apparatus for use in a network to establish a first session with a server external to the network in order to allow access from the server and connected to a relay device provided in the network, the printing apparatus comprising:
a hardware processor which, under control of a program stored in a memory, is configured to:
perform communication with the server via the relay device while the first session is established;
continuously monitor communication conditions with the relay device while the first session is established;
selectively change an operation mode of the printing apparatus between a first mode and a second mode according to the communication conditions with the relay device, the first mode being a mode in which the printing apparatus operates as a gateway, and the second mode being a mode in which the printing apparatus does not operate as a gateway; and
establish, when the operation mode is changed from the second mode to the first mode, a second session with the server which is a new session established after successful authentication of the printing apparatus by the server,
wherein the hardware processor establishes the second session when it is determined, by monitoring the communication conditions with the relay device while the printing apparatus operates in the second mode and the first session is established, that it is impossible to perform communication with the relay device, and
wherein, when the printing apparatus establishes the second session while operating in the first mode, the printing apparatus directly connects to the server by bypassing the relay device, and when the printing apparatus establishes the first session while operating in the second mode, the printing apparatus connects to the server via the relay device.

2. The printing apparatus according to claim 1, wherein the hardware processor disconnects the second session when it becomes possible to perform communication with the relay device.

3. The printing apparatus according to claim 1, wherein the hardware processor:
sends, to the server, first specific information for identifying the relay device and second specific information for identifying the printing apparatus, and
establishes the second session when first authentication performed by the server based on the first specific information and the second specific information is successful.

4. The printing apparatus according to claim 3, wherein the hardware processor:
sends, to the server, a code issued after the first authentication performed by the server is successful, and
establishes the second session when second authentication performed by the server based on the code received is successful.

5. The printing apparatus according to claim 3, wherein:
when a new relay device is used as the relay device in order to establish the first session, the hardware processor receives new first specific information for identifying the new relay device, and
after receiving the new first specific information, when it becomes impossible to perform communication with the new relay device, the hardware processor sends, to the server, the new first specific information and the second specific information in order to establish the second session.

6. The printing apparatus according to claim 1, wherein the hardware processor is further configured to send a specific command to the relay device to determine that, when no response to the specific command is sent from the relay device, it becomes impossible to perform communication via the relay device with the server,
wherein the hardware processor establishes the second session when is determined that it becomes impossible to perform the communication via the relay device with the server.

7. The printing apparatus according to claim 1, wherein, while the second session is established, the hardware processor performs communication with another printing apparatus not having the first mode so as to allow said another printing apparatus to perform communication with the server.

8. A method for supporting access to a printing apparatus provided in a network from a server external to the network when the printing apparatus establishes a first session with the server in order to allow the access from the server and a trouble occurs in a relay device provided in the network, the printing apparatus being operable in a first mode in which the printing apparatus functions as a gateway and a second mode in which the printing apparatus does not function as the gateway, and the method comprising:
establishing the first session with the server via the relay device;
continuously monitoring communication conditions with the relay device while the first session is established;
selectively changing an operation mode of the printing apparatus between the first mode and the second mode according to the communication conditions with the relay device; and
establishing, when the operation mode is changed from the second mode to the first mode, a second session with the server which is a new session established after successful authentication of the printing apparatus by the server,
wherein the second session is established when it is determined, by monitoring the communication conditions with the relay device while the printing apparatus operates in the second mode and the first session is established, that it is impossible to perform communication with the relay device, and wherein, when the printing apparatus establishes the second session while operating in the first mode, the printing apparatus directly connects to the server by bypassing the relay device, and when the printing apparatus establishes the first session while operating in the second mode, the printing apparatus connects to the server via the relay device.

9. A non-transitory recording medium storing thereon a computer readable program used in a printing apparatus, the printing apparatus being operable in a network to establish a first session with a server external to the network in order to allow access from the server, being connected to a relay device provided in the network, and being operable in a first mode in which the printing apparatus functions as a gateway and a second mode in which the printing apparatus does not function as the gateway, and the computer readable program controlling the printing apparatus to perform processing comprising:

communication processing for performing communicating with the server via the relay device while the first session is established;

monitoring processing for continuously monitoring communication conditions with the relay device while the first session is established;

mode change processing for selectively changing an operation mode of the printing apparatus between the first mode and the second mode according to the communication conditions with the relay device; and establishment processing for establishing, when the operation mode is changed from the second mode to the first mode, a second session with the server which is a new session established after successful authentication of the printing apparatus by the server, wherein the computer readable program controls the printing apparatus to perform, as the establishment processing, processing for establishing the second session with the server when it is determined, by monitoring the communication conditions with the relay device while the printing apparatus operates in the second mode and the first session is established, that it is impossible to perform communication with the relay device, and wherein the computer readable program controls the printing apparatus such that, when the printing apparatus establishes the second session while operating in the first mode, the printing apparatus directly connects to the server by bypassing the relay device, and when the printing apparatus establishes the first session while operating in the second mode, the printing apparatus connects to the server via the relay device.

10. The non-transitory recording medium according to claim 9, wherein the printing apparatus is caused to perform disconnection processing for disconnecting the second session when it becomes possible to perform communication with the relay device.

11. The non-transitory recording medium according to claim 9, wherein the printing apparatus is caused to perform the establishment processing when first specific information for identifying the relay device and second specific information for identifying the printing apparatus are sent to the server and first authentication performed by the server based on the first specific information and the second specific information is successful.

12. The non-transitory recording medium according to claim 11, wherein the printing apparatus is caused to perform the establishment processing when a code issued after the first authentication performed by the server is successful is sent to the server and second authentication performed by the server based on the code received is successful.

13. The non-transitory recording medium according to claim 11, wherein the printing apparatus is caused to perform transmission processing for receiving, when a new relay device is used as the relay device in order to establish the first session, new first specific information for identifying the new relay device, and after receiving the new first specific information, when it becomes impossible to perform communication with the new relay device, sending the new first specific information and the second specific information to the server in order to establish the second session.

14. The non-transitory recording medium according to claim 9, wherein:

the printing apparatus is caused to perform determination processing for sending a specific command to the relay device to determine that, when no response to the specific command is sent from the relay device, it becomes impossible to perform communication via the relay device with the server, and the printing apparatus is caused to perform the establishment processing when it is determined, in the determination processing, that it becomes impossible to perform the communication via the relay device with the server.

15. The non-transitory recording medium according to claim 9, wherein, while the second session is established, the printing apparatus is caused to perform communication processing for performing communication with another printing apparatus not having the first mode so as to allow said another printing apparatus to perform communication with the server.

16. An application system comprising:

a plurality of printing apparatuses connected to a network;
a server external to the network; and
a relay device which is provided in the network and which relays communication between the server and the plurality of printing apparatuses by establishing a first session with the server in order to allow access from the server, wherein a first printing apparatus among the plurality of printing apparatuses comprises a hardware processor which, under control of a program stored in a memory, is configured to:

continuously monitor communication conditions with the relay device while the first session is established;

selectively change an operation mode of the first printing apparatus between a first mode and a second mode according to the communication conditions with the relay device, the first mode being a mode in which the first printing apparatus operates as a gateway, and the second mode being a mode in which the first printing apparatus does not operate as a gateway; and establish, when the operation mode is changed from the second mode to the first mode, a second session with the server which is a new session established after successful authentication of the printing apparatus by the server, wherein the hardware processor establishes the second session when it is determined, by monitoring the communication conditions with the relay device while the first printing apparatus operates in the second mode and the first session is established, that it is impossible to perform communication with the relay device, and wherein, when the first printing apparatus establishes the second session while operating in the first mode, the first printing apparatus directly connects to the server by bypassing the relay device, and when the first printing apparatus establishes the first session while operating in the second mode, the first printing apparatus connects to the server via the relay device.

\* \* \* \* \*